United States Patent

[11] 3,602,849

[72] Inventor Philip R. Geffe
Laurel, Md.
[21] Appl. No. 828,327
[22] Filed May 27, 1969
[45] Patented Aug. 31, 1971
[73] Assignee Westinghouse Electric Corporation
Pittsburgh, Pa.

[54] BROADBAND GYRATOR CIRCUIT
4 Claims, 7 Drawing Figs.

[52] U.S. Cl. 333/80, 333/24, 330/13
[51] Int. Cl. H01p 1/24
[50] Field of Search 333/80, 24; 330/61, 13, 12

[56] References Cited
UNITED STATES PATENTS
3,112,463 11/1963 Saraga 333/80
3,400,335 9/1968 Orchard et al. 333/80

*Primary Examiner*—Eli Lieberman
*Assistant Examiner*—Saxfield Chatmon, Jr.
*Attorneys*—F. H. Henson and E. P. Klipfel

ABSTRACT: Circuitry for greatly extending the high-performance bandwidth of a gyrator by controlling the negative resistance of the effective impedance. The high performance bandwidth is extended by realizing the gyrator transconductances with a pair of complex poles, instead of real poles.

WITNESSES
H. M. Farkas
James F. Young

INVENTOR
PHILIP R. GEFFE
BY Ernest F. Weyfel
ATTORNEY

BROADBAND GYRATOR CIRCUIT

BACKGROUND OF THE INVENTION

1. Field of the Invention

The present invention relates generally to gyrators and more particularly relates to a gyrator having a greater high performance bandwidth than heretofore available.

2. Description of the Prior Art

A gyrator is a two port device such that one port behaves like an inductance when the other port is loaded with a capacitance. One of the most practical ways of realizing a gyrator is to connect two voltage controlled current sources with high impedances at both ends in a back to back shunt combination.

When a gyrator is made by paralleling two transconductances $g_1$ and $-g_2$, the transconductances must be realized as low pass amplifiers. The gyrator bandwidth can only be a small fraction of the amplifier bandwidth.

Prior art gyrators utilize amplifiers as the voltage controlled current sources which are constructed so that the gain function has its poles on the negative-real axis of the complex-frequency plane, or $s$-plane. As will be further explained hereinafter, this leads to poor gyrator performance.

SUMMARY OF THE INVENTION

It is an object of the present invention to provide a gyrator with a greatly extended high-performance bandwidth.

Another object of the present invention is to provide a gyrator which will be unconditionally stable.

Another object of the present invention is to provide a gyrator wherein its negative resistance is adequately bounded in the useful frequency band.

Briefly, the present invention accomplishes the above-cited objects and other objects and advantages by providing each of the parallel connected transconductances with a pair of complex poles, instead of real poles.

Ideally, any negative resistance in the shunted transconductors should be zero so oscillations will not occur. Since this is not practical, the present invention seeks to adequately bound the negative resistance in the useful frequency band. A low pass active filter is inserted in each transconductance leg to make the gyrator unconditionally stable.

BRIEF DESCRIPTION OF THE DRAWING

Further objects and advantages of the present invention will be readily apparent from the following detailed description taken in conjunction with the drawing, in which:

FIG. 1 illustrates a gyrator made by paralleling two transconductances $g_1$ and $-g_2$. A gyrator is a nonreciprocal two-port device, having an input impedance which is proportional to its load admittance. Hence, one port of the gyrator behaves like an inductance when the other port is loaded with a capacitance. FIG. 1 illustrates the most practical way of realizing a gyrator. The transconductances $g_1$ and $-g_2$, consists of transistorized amplifiers having high impedances at both input and output.

Figure 1:
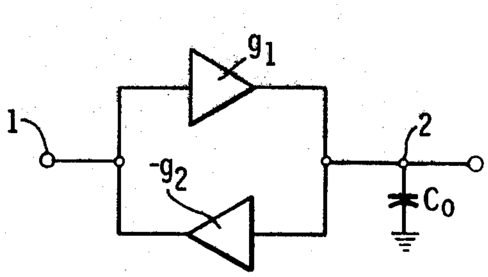
FIG. 1 is a schematic diagram useful in understanding the operation of gyrators in general.

If the output port 2 of the gyrator is loaded with a capacitance $C_0$ then the driving-point impedance $Z_{11}$ of the input port 1 is given by:

$$Z_{11}=\frac{CoS}{g_1 g_2}, \tag{1}$$

where $s$ equals the frequency operator $j\omega$. It may be assumed, without loss of generality, that the amplifier impedances making up the transconductances $g_1$ and $-g_2$ are infinite at both ends.

Bandwidths of gyrators of the prior art are limited to a small fraction of the amplifier bandwidth. I have discovered that this limitation is a result of the amplifiers in gyrators being built so that the gain function has its poles on the negative-real axis of the complex-frequency plane, or $s$-plane. This leads to poor gyrator performance. For example, if the transconductances, $g_1$ and $-g_2$, are realized with low pass amplifiers, then:

$$\left.\begin{aligned} g_1 &\rightarrow \frac{g_1}{s+1} \\ g_2 &\rightarrow \frac{g_2}{s+1} \end{aligned}\right\} \tag{2}$$

The transconductances $g_1$ and $g_2$ cannot be pure since the gain of physical amplifiers is dependent on frequency. If it is temporarily assumed that both amplifiers have one pole on the real axis and that both amplifiers have unit bandwidths, that is they are down 3 db. at 1 radian per second, then substituting equation (2) into equation (1) the driving point impedance becomes:

$$Z_{11}=Ls(s+1)^2 \tag{3}$$

where $L=Co/g_1g_2$.

By substituting the frequency function $j\omega$ for $s$ into equation (3), the frequency behavior of the driving point impedance is then:

$$(Z_{11}(j\omega)/L)=R+j\omega X \tag{4}$$

where $$\left.\begin{aligned} R &= -2\omega^2 \\ X &= 1-\omega^2 \end{aligned}\right\} \tag{5}$$

Figure 2:
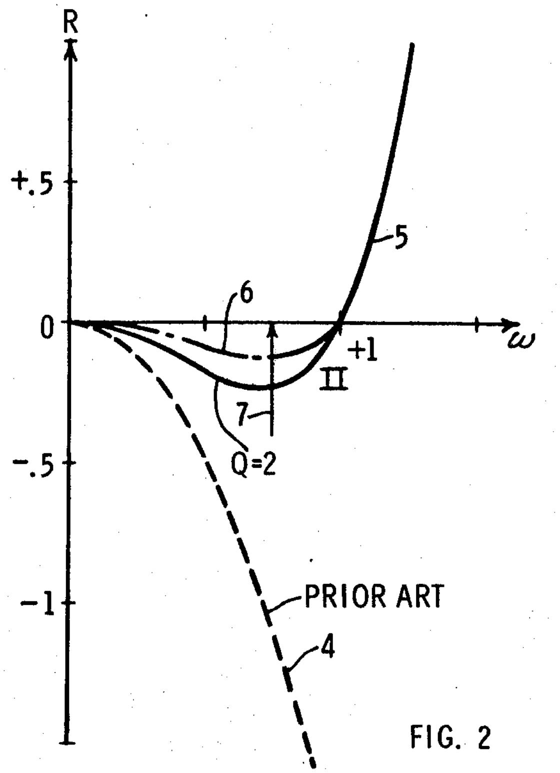
FIG. 2 is a graphical illustration of the frequency behavior of the negative resistance presented by the gyrator transconductances.

The frequency behavior of the real part $R$ of the driving point impedance $Z_{11}$ is graphically shown by the dotted line 4 of FIG. 2. Ideally, the resistance of the driving point impedance which is a negative value would be preferred to be zero, so that oscillations will not occur.

It can be seen that the gyrator behaves properly at very low frequencies. As frequency increases, the negative resistance appears and grows as the square of the frequency. This causes Q enhancement and high sensitivity. At the same time, the inductance is diminishing until, at $\omega=1$, the reactance term $X$ vanishes, and a pure negative resistance of $R$ of $-2L$ ohms remains. This leads to problems with instability and high sensitivity at relatively low frequencies. As a result, the high performance bandwidth of prior art gyrators is only a small fraction of the amplifier bandwidth.

Figure 3:
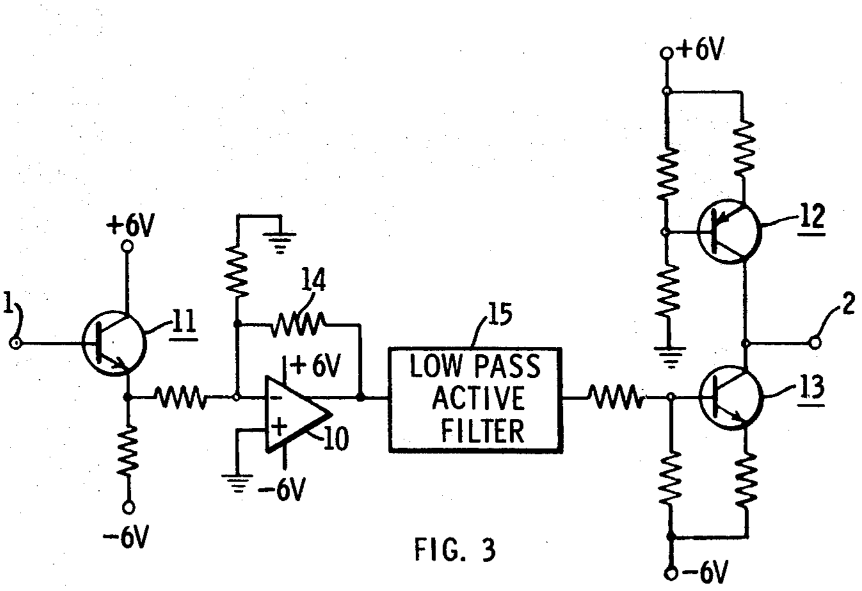
FIGS. 3 and 4 are electrical schematic diagrams of the transconductances $g_1$ and $g_2$ utilized in the gyrator of FIG. 1.

The transconductance $g_1$ can be realized, for example, as schematically illustrated in FIG. 3. The input port 1 of the gyrator is connected to the inverting input of an operational amplifier 10 through an emitter follower circuit 11 to provide a high impedance to the input 1. A transistor stage 12 is used as a high resistance value or current source connected to the output collector of an amplifying stage 13. The feedback resistor 14 sets the gain of the operational amplifier 10. The use of a low pass active filter 15 in such a circuit is in accordance with the present invention and its utilization will be more fully described hereinafter.

Figure 4:
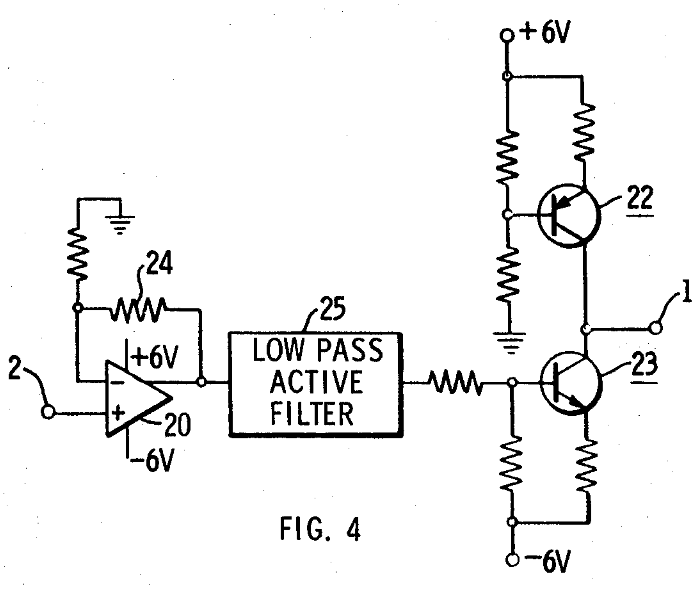

The transconductance $g_2$ is realized, for example, by the electrical schematic of FIG. 4. An operational amplifier 20 has its plus input directly connected to the output port 2 since the plus input of the operational amplifier 20 already has a high impedance. Again an amplifying stage 23 connected to the output of the operational amplifier 20 is provided with a high resistance or current source in the form of the transistor stage 22. A feedback resistor 24 is varied to adjust the gain of the operational amplifier 20. Again, the use of the low pass active filter in accordance with the present invention will be more fully described hereinafter.

Figure 5:
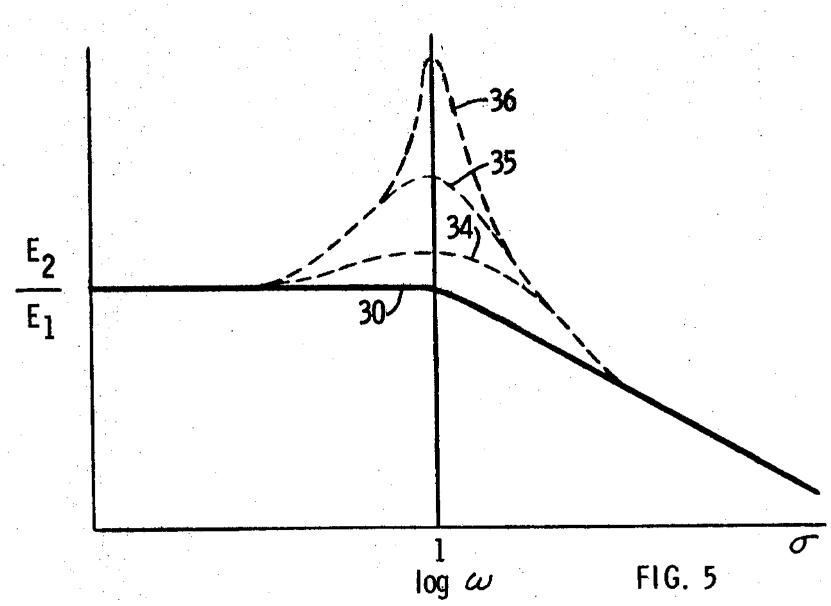
FIG. 5 is a graphical representation of a low pass function useful in understanding the operation of the present invention.

FIG. 5 illustrates the frequency response for an amplifier such as illustrated in FIGS. 3 and 4. The gain, $(E_2/E_1)$ of such an amplifier is plotted against the frequency in log $\omega$ form. The frequency is normalized so that the corner of the frequency response curve 30 shown as a solid line rolls off at log $\omega$ equal to 1.

Figure 6:
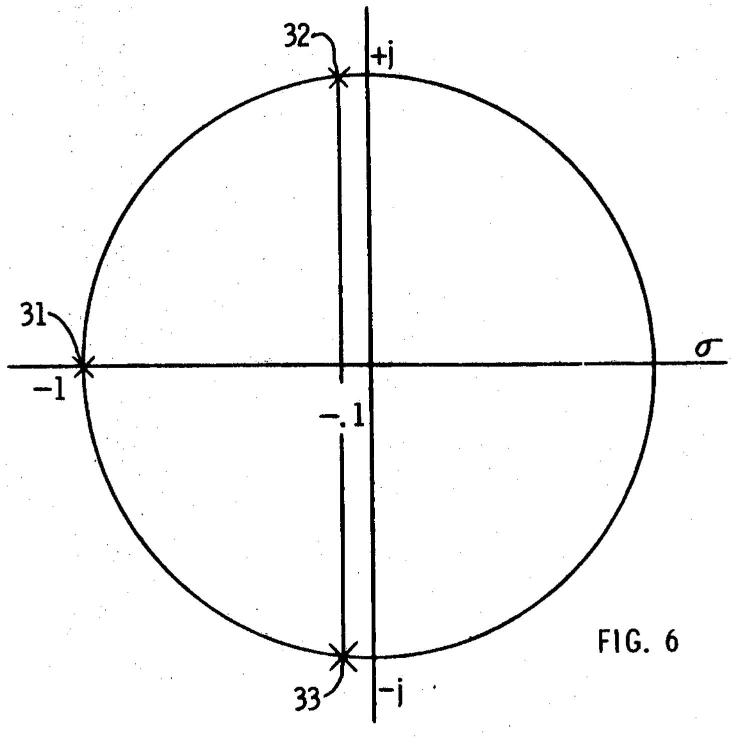
FIG. 6 graphically illustrates the desired operation of the present invention in the complex-frequency plane.

FIG. 6 illustrates the complex frequency plane or *s*-plane of such an amplifier with the frequency bandwidth again normalized by placing the poles on the unit circle. Conventional amplifiers used to realize gyrators have gain poles on the negative-real axis in the *s*-plane as indicated by the pole 31.

In order to broadband the gyrator in accordance with the present invention, the frequency behavior of the amplifier is altered to provide a pair of complex poles 32 and 33 on the unit circle in the *s*-plane. The gain of such an altered amplifier will then peak at the rolloff point in the manner of a hump which may peak as at 34, 35 or 36. In such a manner, the high performance bandwidth is extended. The hump is a trivial consequence of the complex poles but it will certainly happen when the complex poles have sufficient $Q$.

The results of each amplifier having a pair of complex poles on the unit circle of the *s*-plane, on gyrator performance, can be seen by writing the transconductances $$\left.\begin{aligned} g_1 &\rightarrow \frac{g_1}{s^2+\left(\frac{1}{Q}\right)s+1} \\ g_2 &\rightarrow \frac{g_2}{s^2+\left(\frac{1}{Q}\right)s+1} \end{aligned}\right\} \quad (6)$$

where $Q$ is the pole-$Q$ of the complex poles.

The driving-point impedance $Z_{11}$ at the input port 1 of a gyrator would then be:

$$Z_{11}=Ls\left[s^2+\left(\frac{1}{Q}\right)s+1\right]^2 \quad (7)$$

and the frequency behavior of this impedance is then:

$$\frac{Z_{11}(j\omega)}{L}=R+j\omega X \quad (8)$$

$$R=-\frac{2\omega^2}{Q}(1-\omega^2)$$

$$X=\omega^4-\left(2+\frac{1}{Q^2}\right)\omega^2+1 \quad (9)$$

for

The frequency behavior of the real part of the transfer impedance $Z_{11}$ is graphically shown by the solid curve 5 of FIG. 2. In the useful frequency band, the negative resistance is adequately bounded, and any networks which contain the gyrator will be unconditionally stable if they provide a small positive resistance. The curve 5 is shown for a choice of $Q$=2 which is a practical value. Higher $Q$ values will give somewhat better results as, for example, the dash-dot curve 6 for increasing $Q$ as illustrated by the arrow 7.

Hence, in accordance with the present invention, a low pass active filter 15 is cascaded with the amplifier in the transconductance $g_1$ of FIG. 3 and a low pass active filter 25 is cascaded with the amplifier in the transconductance $g_2$ of FIG. 4.

Figure 7:
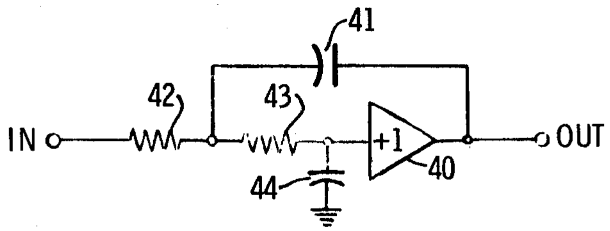
FIG. 7 is an electrical schematic diagram of one low pass active filter useful in realizing the complex poles of the gyrator transconductances.

The complex poles of the gyrator transconductance can be realized in many ways, one of which is shown in FIG. 7. The filter includes a voltage follower 40 connected with a feedback capacitor 41 and resistors 42 and 43 between input and output terminals. A capacitor 44 connects the input of the voltage follower to a point of reference potential.

Representative values of the low pass active filter to realize the desired complex poles when the angular frequency $\omega_0$ is normalized and with a $Q$ of 2 are such that the voltage follower may be in the form of a single transistor stage, the capacitors 41 and 44 of unit farad and the resistor 42 being equivalent to 4 ohms and resistor 43 to one-fourth ohm. As will be readily understood by those skilled in the art, the foregoing are merely representative values for a normalized frequency and the resistors are to be scaled up while the capacitors are divided by the same factor to arrive at any desired operating frequency.

Such a low pass active filter as illustrated in FIG. 7 is then capable of use for insertion as a low pass active filter 15 in the transconductance $g_1$ of FIG. 3 and as the low pass active filter 25 in the transconductance $g_2$ of FIG. 4.

Representative values of the transconductances 9$_1$ and $q_2$ are, for example, that the operational amplifiers be of the Motorola-type MC152 G. The amplifier stages 13 an 23 utilize transistor designations 2N2218, manufactured by Westinghouse while the high resistance stages 12 and 22 utilize the transistor type 2N3251, manufactured by Westinghouse. The emitter follower circuit 11 of the transconductance circuit $q_1$ utilizes a transistor type 2N2511 by Westinghouse.

It is to be noted that one of the prime advantages of the present invention is the capability of obtaining a gyrator in integrated circuit form. Broadband performance will be provided by cascading low pass active filters with the amplifiers in each of the transconductances which are parallelly connected to make up the gyrator. The input terminals 1 of FIGS. 3 and 4 are connected together and the output terminals 2 of FIGS. 3 and 4 are connected together to realize the gyrator.

While the present invention has been described with a degree of particularity for the purposes of illustration, it is to be understood that all modifications, alterations and substitutions within the spirit and scope of the present invention are herein meant to be included. For example, the low pass active filter of FIG. 7 is merely one illustration of the attainment of such a filter and many other such attainments will be well known to those skilled in the filter art.

I claim as my invention:

1. A broadband gyrator circuit comprising in combination; first and second transconductance means of opposite signs, each including amplifier means having high input and output impedances; and filter means cascaded with each amplifier means for providing a pair of complex poles on the unit circle of the complex-frequency plane of each transconductance means.

2. The combination of claim 1 wherein said filter means includes a first low pass active filter cascaded in a first circuit with the amplifier means of said first transconductance means and a second low pass active filter cascaded in a second circuit with the amplifier means of said second transconductance means; and means for connecting said first circuit and said second circuit in parallel.

3. The combination of claim 2 wherein each said low pass active filter includes resistance means and capacitive means in combination with a voltage follower stage.

4. The combination of claim 3 wherein said resistance means includes first resistance means and second resistance means and wherein the magnitudes of each capacitive means, for a normalized circuit, are substantially equal and equivalent to 1 farad while the magnitudes of said first and second resistance means have a ratio of substantially 16 to 1 for said normalized circuit.